(12) United States Patent
Gehtman et al.

(10) Patent No.: US 11,397,822 B2
(45) Date of Patent: Jul. 26, 2022

(54) SYSTEM AND METHOD OF UTILIZING DOCUMENT SECURITY

(71) Applicant: Dell Products L.P., Round Rock, TX (US)

(72) Inventors: Yevgeni Gehtman, Modi'in (IL); Tomer Shachar, Omer (IL); Maxim Balin, Gan Yavne (IL)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 16/936,652

(22) Filed: Jul. 23, 2020

(65) Prior Publication Data

US 2022/0027484 A1    Jan. 27, 2022

(51) Int. Cl.
| | |
|---|---|
| *H04L 29/06* | (2006.01) |
| *G06F 21/62* | (2013.01) |
| *G06F 21/60* | (2013.01) |
| *G06F 21/64* | (2013.01) |
| *G06F 21/57* | (2013.01) |

(52) U.S. Cl.
CPC .......... *G06F 21/6209* (2013.01); *G06F 21/57* (2013.01); *G06F 21/602* (2013.01); *G06F 21/64* (2013.01)

(58) Field of Classification Search
CPC .... G06F 21/6209; G06F 21/57; G06F 21/602; G06F 21/64
See application file for complete search history.

(56) References Cited

U.S. PATENT DOCUMENTS

| | | | | |
|---|---|---|---|---|
| 7,200,760 | B2 * | 4/2007 | Riebe | G06F 21/125 713/188 |
| 2004/0003271 | A1 * | 1/2004 | Bourne | G06F 21/10 713/193 |
| 2004/0122931 | A1 * | 6/2004 | Rowland | H04L 41/12 709/223 |
| 2004/0268106 | A1 * | 12/2004 | Holmberg | G06F 8/65 713/1 |
| 2006/0064488 | A1 * | 3/2006 | Ebert | H04L 63/0442 709/225 |
| 2010/0146283 | A1 * | 6/2010 | Poitier | G11B 20/0084 713/176 |
| 2013/0040657 | A1 * | 2/2013 | Jackson | G06F 21/84 455/456.1 |
| 2015/0026826 | A1 * | 1/2015 | Allegri | H04W 12/37 726/29 |

* cited by examiner

*Primary Examiner* — Vance M Little
(74) *Attorney, Agent, or Firm* — Baker Botts L.L.P.

(57) ABSTRACT

In one or more embodiments, one or more systems, one or more methods, and/or one or more processes may: read a document; determine that the document includes executable instructions; execute the executable instructions of the document; determine if a security agent exists on an information handling system (IHS); if the security agent does not exist on the IHS, corrupt data of the document; if the security agent does exist on the information handling system: generate an array of bytes associated with multiple identifiers of multiple of components of the IHS; determine a first hash value of the array of bytes and the document; retrieve a second hash value from the document; determine if the first hash value matches the second hash value; if the first hash value matches the second hash value, provide the data of the document to an application; and if not, corrupt the data of the document.

17 Claims, 9 Drawing Sheets

SYSTEM AND METHOD OF UTILIZING DOCUMENT SECURITY

BACKGROUND

Field of the Disclosure

This disclosure relates generally to information handling systems and more particularly to utilizing document security.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may read a document; may determine that the document includes document security executable instructions; may execute the document security executable instructions of the document; may determine if a security agent exists on an information handling system; if the security agent does not exist on the information handling system, may corrupt data of the document; and if the security agent does exist on the information handling system: may generate an array of bytes associated with multiple of identifiers of multiple components of the information handling system; may determine a first hash value of the array of bytes and the document; may retrieve a second hash value from the document; may determine if the first hash value matches the second hash value; if the first hash value does not match the second hash value, may corrupt the data of the document; and if the first hash value does match the second hash value, may provide the data of the document to the application.

In one or more embodiments, executing the document security executable may include the application executing the document security executable instructions of the document. In one or more embodiments, executing the document security executable may include the application causing a processor of the information handling system to execute the document security executable instructions of the document. In one or more embodiments, the multiple of the multiple components of the information handling system include two of more of a processor identifier of the processor, a graphics processing unit (GPU) identifier of a GPU, a display identifier of a display, a volatile memory medium identifier of a volatile memory medium, a first non-volatile memory medium identifier of a first non-volatile memory medium, a second non-volatile memory medium identifier of a second non-volatile memory medium, a network interface identifier of a network interface, an information handling system firmware (IHSFW) identifier of IHSFW, a virtual private network (VPN) identifier of a VPN connection, a keyboard identifier of a keyboard, and a pointing device identifier of a pointing device.

In one or more embodiments, at least one of the multiple identifiers may include a network address. In one or more embodiments, generating the array of bytes may include combining the multiple identifiers of the multiple components of the information handling system. In one or more embodiments, a kernel loadable module includes the security agent. For example, the one or more systems, the one or more methods, and/or the one or more processes may further load the kernel loadable module into an operating system executing on the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
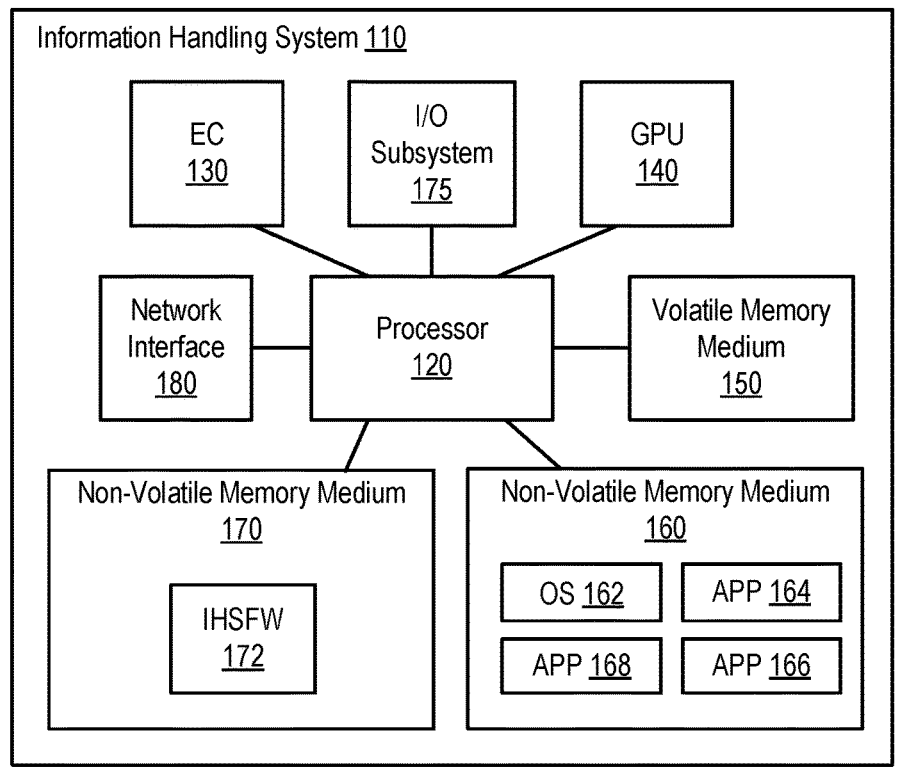
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, various security methods may attempt to prevent data theft (e.g., data leakage) by policies and/or regulations. For example, there may be no active processes that can detect that a document (e.g., a word processing document, a spreadsheet document, etc.) is being opened in a controlled environment. For instance, if a cyber criminal gains access to a restricted area, the cyber criminal may copy one or more documents and open the one or more documents outside an organization's location (e.g., outside the controlled environment). When documents are taken by a cyber criminal (e.g., data leakage), those documents may be considered "lost causes." For example, an organization may not have an ability to recover those documents from the cyber criminal, to track those documents, or to prevent dissemination of those documents.

In one or more embodiments, saving a document to a memory medium may be intercepted to add one or more security features within the documents. For example, a call to a write subroutine of an operating system may be intercepted by a security agent. For instance, the security agent may add one or more security features within a document. In one or more embodiments, the one or more security features within the document may include document security executable instructions. For example, the document security executable instructions may ensure that the document may be opened on an information handling system that is authorized to open the document. For instance, if the document is opened on an information handling system that is not authorized to open the document, the document security executable instructions may corrupt data of the document.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an embedded controller (EC) 130, a graphics processing unit (GPU) 140, a volatile memory medium 150, non-volatile memory media 160 and 170, an I/O subsystem 175, and a network interface 180. As illustrated, EC 130, GPU 140, volatile memory medium 150, non-volatile memory media 160 and 170, I/O subsystem 175, and network interface 180 may be communicatively coupled to processor 120.

In one or more embodiments, one or more of EC 130, GPU 140, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of EC 130, GPU 140, volatile memory medium 150, non-volatile memory media 160 and 170, I/O subsystem 175, and network interface 180 may be communicatively coupled to processor 120 via one or more PCI-Express (PCIe) root complexes. In another example, one or more of an EC 130, GPU 140, I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein.

In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
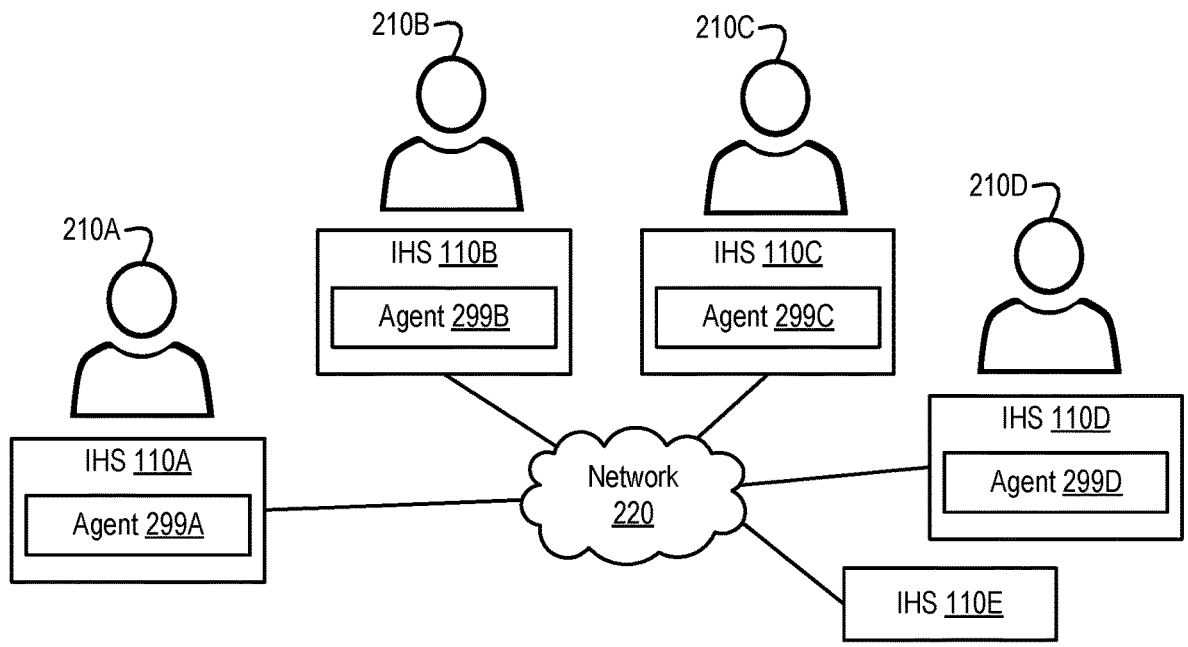
FIG. 2 illustrates an example of users utilizing information handling systems, according to one or more embodiments.

Turning now to FIG. 2, an example of users utilizing information handling systems is illustrated, according to one or more embodiments. As shown, users 210A-210D may utilize respective information handling systems (IHSs) 110A-110D. For example, user 210A may utilize APP 164, executing on IHS 110A, to create and/or modify a document. In one or more embodiments, the document may include one or more files. As an example, the document may include an open extensible markup language (XML) file (e.g., a DOCX file, a XLSX file, etc). For instance, the open XML file may include one or more compressed files. In one or more embodiments, the document may include a word processing document, a spreadsheet document, a presentation document (e.g., a PowerPoint document), an audio document, a video document, or an image document, among others.

As illustrated, IHSs 110A-10E may be coupled to a network 220. In one or more embodiments, network 220 may include a wired network, a wireless network, an optical network, or a combination of the foregoing, among others. In one or more embodiments, network 220 may include and/or be coupled to various types of communications networks. For example, network 220 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, a first IHS 110 may communicate with a second IHS 110 via network 220. For example, IHS 110E may include a document server. In one instance, IHS 110A may retrieve one or more documents from IHS 110E. In another instance, IHS 110A may write (e.g., save) one or more documents to IHS 110E. As an example, IHS 110E may store one or more document via a memory medium attached to IHS 110E or included by IHS 110E.

As illustrated, IHSs 110A-110D may include security agents 299A-299D, respectively. In one or more embodiments, a security agent 299 may include processor instructions that may implement at least a portion of one or more systems, at least a portion of one or more flowcharts, at least a portion of one or more methods, and/or at least a portion of one or more processes described herein.

Figure 3:
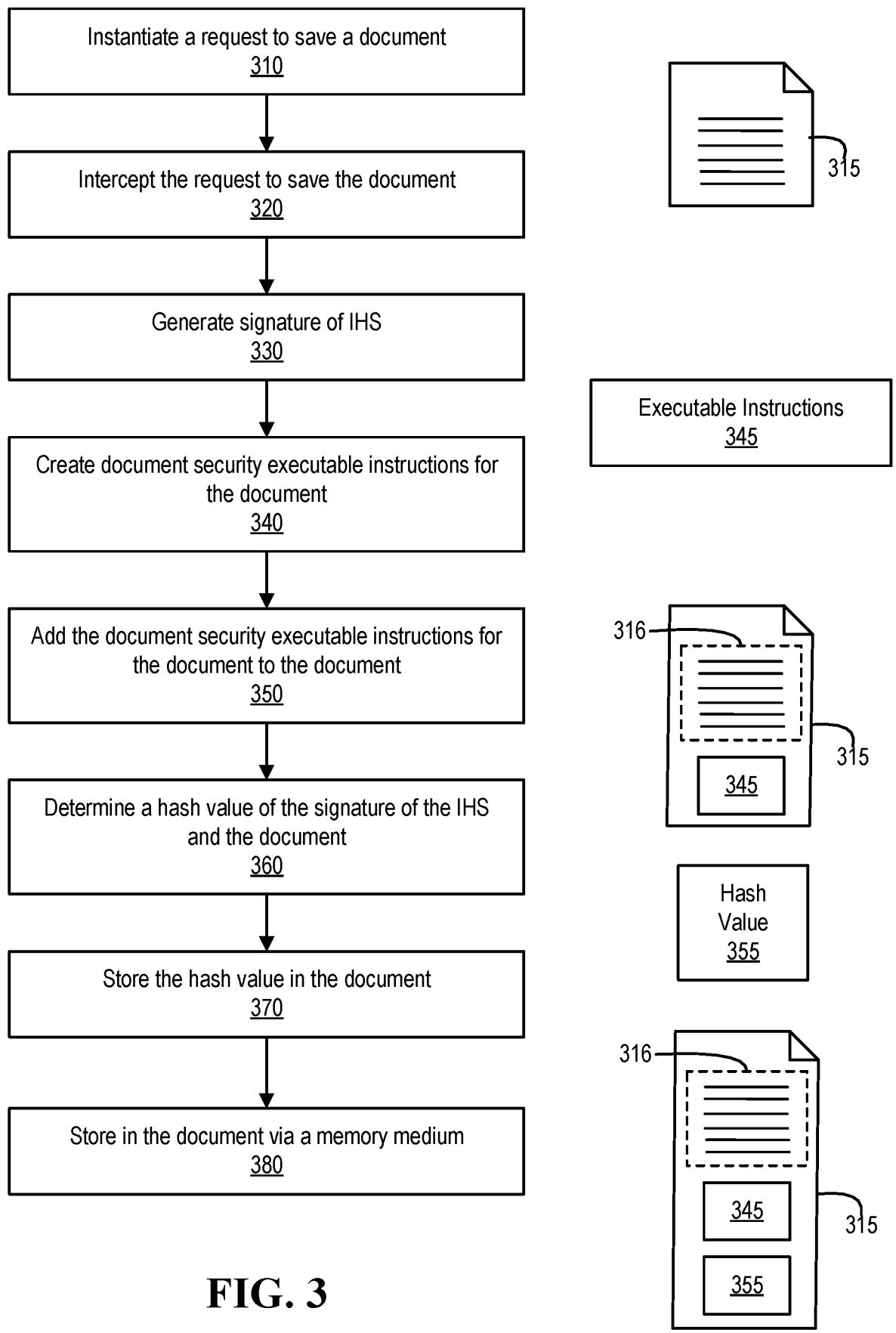
FIG. 3 illustrates an example of a method of saving a document, according to one or more embodiments.
Figure 4A:
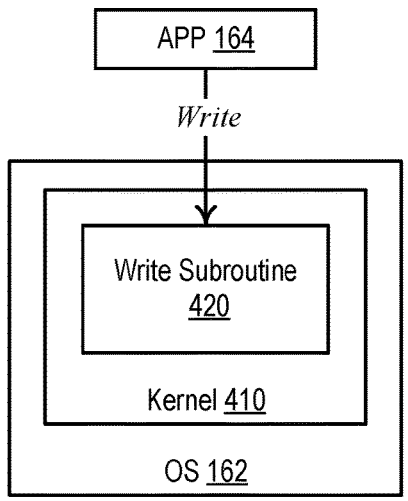
FIG. 4A illustrates an example of an application calling a write subroutine of a kernel of an operating system, according to one or more embodiments.

Turning now to FIG. 3, an example of a method of saving a document is illustrated, according to one or more embodiments. At 310, a request to save a document may be instantiated. For example, APP 164 may instantiate a request to OS 162 to save a document 315. In one or more embodiments, a request to save a document may include calling a subroutine of a kernel of an operating system. For example, instantiating a request to save document 315 may include calling a write subroutine 420 of a kernel 410 of OS 162, as illustrated in FIG. 4A.

Figure 4B:
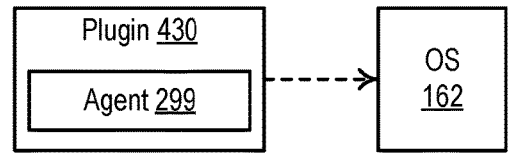
FIG. 4B illustrates an example of utilizing a plugin with an operating system, according to one or more embodiments.
Figure 4C:
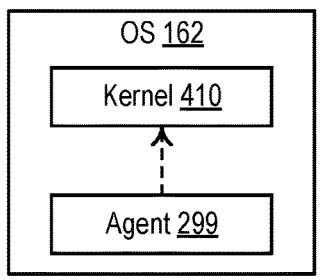
FIG. 4C illustrates an example of utilizing a security agent with a kernel of an operating system, according to one or more embodiments.

In one or more embodiments, a plugin may be installed in an operating system that may intercept a write subroutine and/or a read subroutine. For example, a plugin 430 may be installed in OS 162, as shown in FIG. 4B. For instance, plugin 430 may include agent 299. In one or more embodiments, a loadable kernel module may include agent 299. For example, agent 299 may be installed in kernel 410, as illustrated in FIG. 4C. For instance, agent 299 may be or may include a device driver or a pseudo device driver. In one or more embodiments, a loadable kernel module may be a kernel extension. In one or more embodiments, a pseudo device driver may not be associated with a physical device. In one or more embodiments, OS 162 may include the driver. For example, the driver may be or include a loadable kernel module. For instance, when OS 162 loads the loadable kernel module, the loadable kernel module may direct or redirect requests to save documents.

Figure 4D:
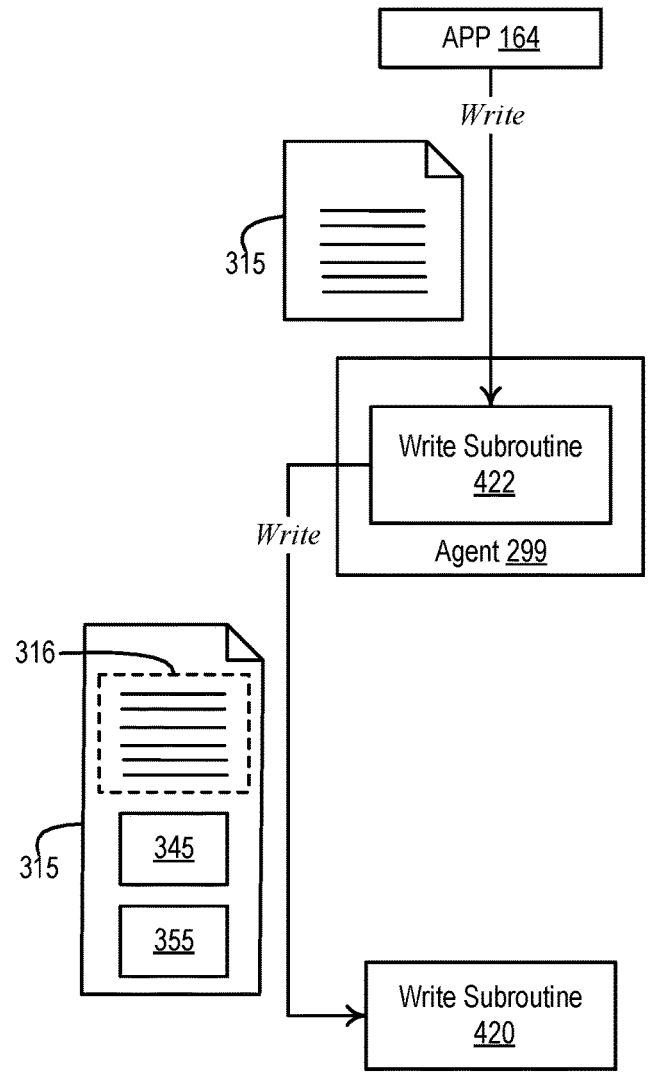
FIG. 4D illustrates an example of a security agent intercepting an application calling a write subroutine of a kernel of an operating system, according to one or more embodiments.

At 320, the request to save the document may be intercepted. For example, a subroutine may intercept the request to save document 315. For instance, a request to save document 315 may include a call to a subroutine to write document 315 to a memory medium. In one or more embodiments, a write subroutine 422 of agent 299 may intercept the call to write subroutine 420 to write document 315 to a memory medium, as shown in FIG. 4D.

At 330, a signature associated with the information handling system may be generated. For example, a signature associated with IHS 110A may be generated. For instance, agent 299A may generate the signature associated with IHS 110A. In one or more embodiments, generating a signature associated with IHS 110A may include determining one or more identifiers of respective one or more components of IHS 110A. For example, the one or more components of IHS 110A may include one or more of processor 120, GPU 140, volatile memory medium 150, non-volatile memory medium 160, non-volatile memory medium 170, network interface 180, a keyboard, and a pointing device (e.g., a mouse, a touchpad, etc.), among others. For instance, the one or more identifiers of respective one or more components of IHS 110A may include one or more of a processor identifier of processor 120, a GPU identifier of GPU 140, a display identifier of a display, a volatile memory medium identifier of volatile memory medium 150 (e.g., a RAM part number), a first non-volatile memory medium identifier of non-volatile memory medium 160, a second non-volatile memory medium identifier of non-volatile memory medium 170, a network interface identifier of network interface 180, an IHSFW identifier of IHSFW 172, a VPN identifier of a VPN connection, a keyboard identifier of the keyboard, and a pointing device identifier of the pointing device. In one or more embodiments, one or more identifiers may include one or more network addresses. In one example, a network address may include a media access control address (MAC) address. In a second example, a network address may include an Internet protocol (IP) address. In another example, an identifier of a domain name service (DNS) server (e.g., an IP address of a DNS server).

At 340, document security executable instructions for the document may be created. For example, document security executable instructions 345 may be created for document 315. For instance, agent 299 may create document security executable instructions 345 for document 315. In one or more embodiments, document security executable instructions 345 may be executable by APP 164. In one or more embodiments, document security executable instructions 345 may include instructions executable by processor 120, may include a script, and/or may include source code that may be compiled and executed by processor 120 and/or executed by a virtual machine.

At 350, the document security executable instructions for the document may be added to the document. For example, document security executable instructions 345 may be added to document 315. For instance, agent 299 may add document security executable instructions 345 to document 315. In one or more embodiments, document security executable instructions 345 may be added anywhere within document 315. In one example, document security executable instructions 345 may be added at a first number of bytes from a beginning of document 315. In a second example, document security executable instructions 345 may be added at a second number of bytes before an ending of document 315. In a third example, document security executable instructions 345 may be added within document data 316. In a fourth example, document security executable instructions 345 may be interleaved in document data 316. In a sixth example, document security executable instructions 345 may be an image within document 315. In another example, document security executable instructions 345 may be at an end of a body of document 315. In one or more embodiments, a body of document 315 may include document data 316.

At 360, a hash value of the signature of the information handling system and the document may be determined. For example, a hash value 355 of the signature of IHS 110A and document 315, which includes executable instructions 345, may be determined. For instance, determining hash value 355 of the signature of IHS 110A and document 315 may include utilizing the signature of IHS 110A and document 315 as input to a one-way hash function.

In one or more embodiments, a one-way hash function may be considered collision free. For example, the one-way hash function may be injective or one-to-one. For instance, $h(z_1)$ and $h(z_2)$ may produce different values, where inputs $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, SHA-384, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1 = h_2(h_3(h_4(z)))$. For instance, a one-way hash function that is a composite function of two or more one-way hash functions may be considered to be and/or said to be strengthened.

At 370, the hash value may be stored in the document. For example, hash value 355 may be stored in document 315. For instance, agent 299 may store hash value 355 in document 315. In one or more embodiments, the hash value may be encrypted via an encryption key. For example, the hash value may be encrypted via a private encryption key to create a digital signature of the signature of the information handling system and the document. For instance, the digital signature may be stored in the document in addition to or in lieu of the hash value. In one or more embodiments, a public encryption key, associated with the private encryption key, may be utilized to recover or obtain the hash value.

At 380, the document may be store via a memory medium. In one example, document 315 may be stored via non-volatile memory medium 160 of IHS 110A. In another example, storing the document may be store via a memory medium may include storing the document via an information handling system coupled to a network. For instance, document 315 may be stored via non-volatile memory medium 160 of IHS 110E. In one or more embodiments, IHS 110A may provide document 315 to IHS 110E via network 220, and IHS 110E may receive document 315 and store document 315 via non-volatile memory medium 160 of IHS 110E.

In one or more embodiments, storing the document via the memory medium may include the subroutine providing document 315, with its additions, to a portion of OS 162 that would have saved document 315 before the subroutine intercepted the request to save document 315. For example, agent 299 may provide document 315, with its additions of document security executable instructions 345 and hash value 355, to write subroutine 420, as illustrated in FIG. 4D. For instance, agent 299 may call subroutine 420. In one or more embodiments, write subroutine 420 may write document 315, with its additions of document security executable instructions 345 and hash value 355, to a memory medium.

Figure 5A:
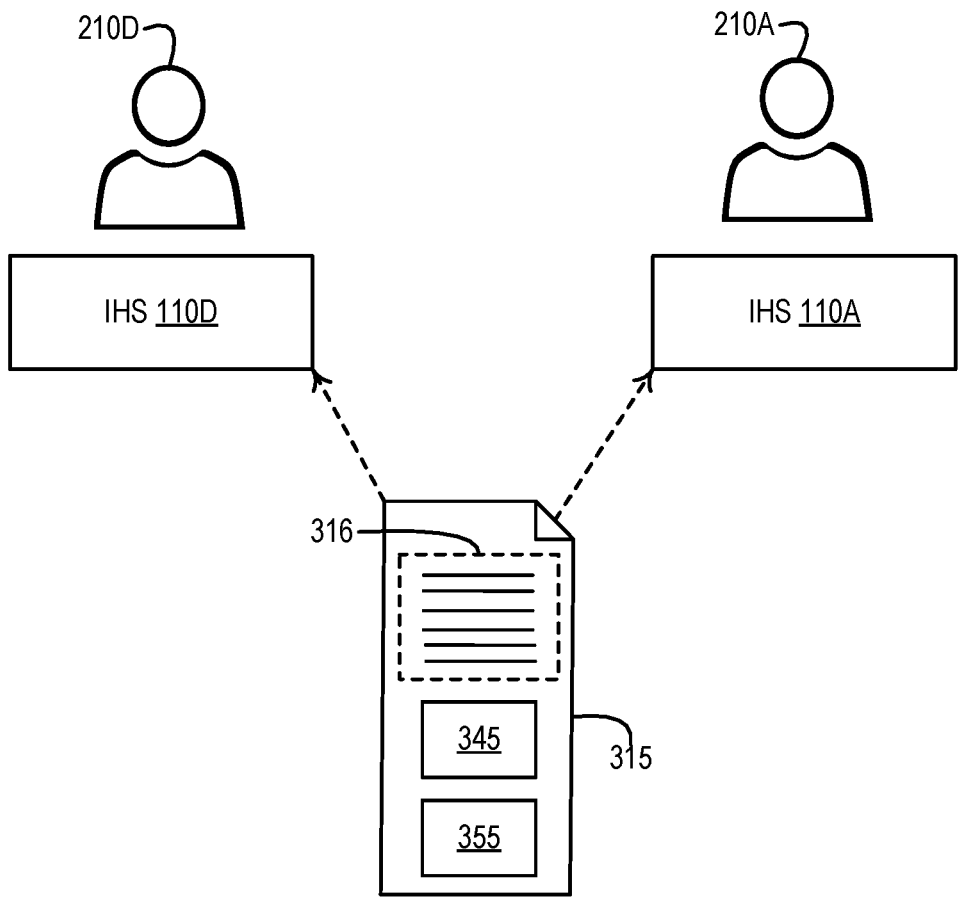
FIGS. 5A and 5B illustrate an example of a method of utilizing a document with document security instructions, according to one or more embodiments.
Figure 5A:
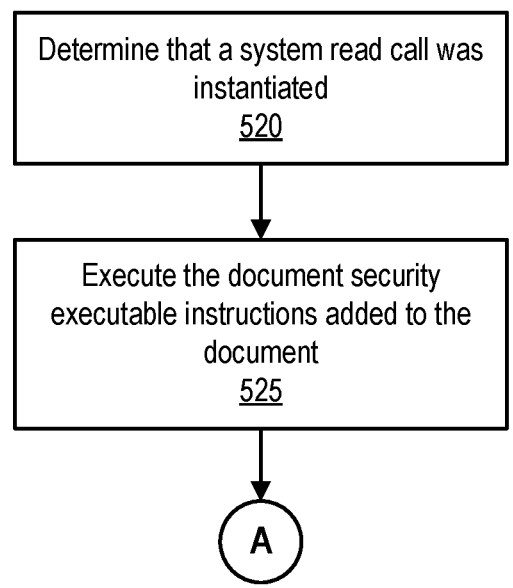
Figure 5B:
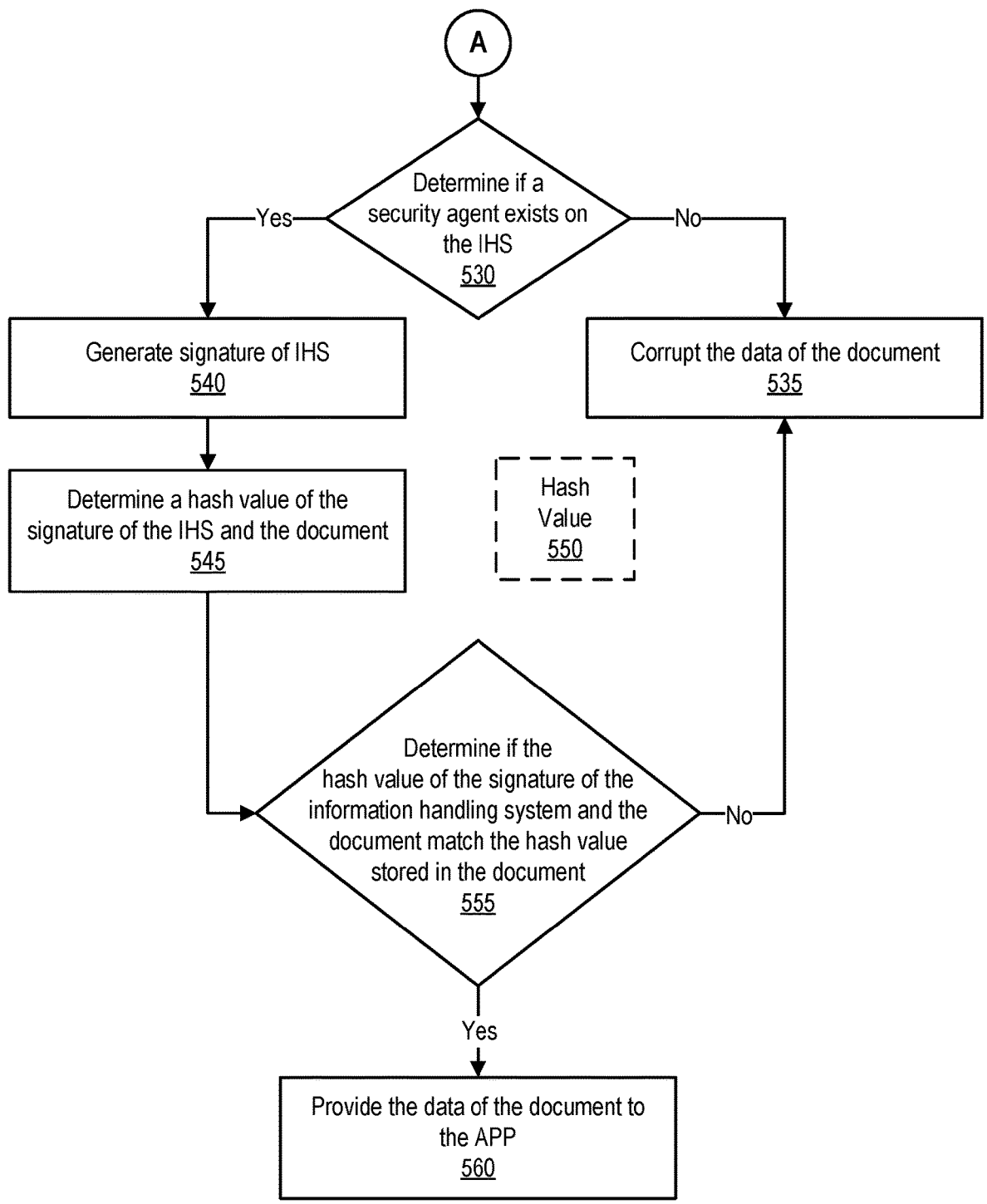

Turning now to FIGS. 5A and 5B, an example of a method of utilizing a document with document security instructions is illustrated, according to one or more embodiments. As shown, IHS 110A and IHS 110D may access document 315. In this example process, IHS 110A may be able to access data 316 of document 315, while IHS 110D may not be able to access data 316 of document 315. At 520, it may be determined that a system read call was instantiated. For example, APP 164 may determine that a system read call was instantiated.

At 525, the instructions added to the document may be executed. For example, document security executable instructions 345 may be executed. In one instance, APP 164 may execute document security executable instructions 345. In another instance, processor 120 may execute document security executable instructions 345. In one or more embodiments, APP 164 may instruct processor 120 to execute document security executable instructions 345.

At 530, it may be determined if a security agent exists on the information handling system. For example, document security executable instructions 345 may determine if a security agent 299 exists on IHS 110. For instance, document security executable instructions 345 may query OS 162 to determine if security agent 299 exists on IHS 110.

If the security agent does not exist on the information handling system, the data of the document may be corrupted, at 535. For example, security agent 299C may not exist on IHS 110D. If the security agent does not exist on IHS 110D, document security executable instructions 345 may corrupt data 316. In one example, data 316 may include word processing data (e.g., a letter, a report, a contract, a chapter of a book, a book, a play, a screen play, etc.). In a second example, data 316 may include spreadsheet data. In a third example, data 316 may include graphics data (e.g., jpeg graphics data, Photoshop graphics data, Visio drawing data, etc.). In a fourth example, data 316 may include audio data (e.g., sound data). In another example, data 316 may include video data (e.g., motion image data).

In one or more embodiments, corrupting data 316 may include overwriting data 316. In one example, corrupting data 316 may include overwriting data 316 with a single byte (e.g., writing the single byte to all bytes of data 316). In another example, corrupting data 316 may include overwriting data 316 with multiple bytes (e.g., writing a string of bytes to data 316). In one instance, the multiple bytes may be repeatedly written over one or more portions of data 316. In another instance, the multiple bytes may be random bytes, which may be written over one or more portions of data 316.

If the security agent does exist on the information handling system, a signature of the information handling system may be generated, at 540. In one or more embodiments, method element 540 may be performed in a similar or same fashion as method element 330. In one example, security agent 299A may generate a signature of IHS 110A. In another example, IHS 110D may include agent 299D, and security agent 299D may generate a signature of IHS 110D.

At 545, a hash value of the signature of the information handling system and the document may be determined. For example, a hash value 550 of the signature of IHS 110A and document 315, which includes document security executable instructions 345, may be determined. For instance, security agent 299 may determine hash value 550. At 555, it may be determined if the hash value of the signature of the information handling system and the document match the hash value stored in the document. For example, it may be determined if hash value 550 matches hash value 355. For instance, security agent 299 may determine if hash value 550 matches hash value 355.

In one or more embodiments, a signature of IHS 110A may not match a signature of IHS 110D. If the signature of IHS 110A does not match the signature of IHS 110D, a hash value of the signature of IHS 110A and document 315 may not match a hash value of the signature of IHS 110D and document 315. In one or more embodiments, a first signature of IHS 110A may not match a second signature of IHS 110A. For example, an identifier associated with IHS 110A may have changed since hash value 355 was determined. If the first signature of IHS 110A does not match the second signature of IHS 110A, a first hash value of the first signature of IHS 110A and document 315 may not match a second hash value of the second signature of IHS 110A and document 315.

If the hash value of the signature of the information handling system and the document does not match the hash value stored in the document, the process may proceed to 535. For example, if hash value 550 does not match hash value 355, the process may proceed to 535. If the hash value of the signature of the information handling system and the document does match the hash value stored in the document (e.g., hash value 550 does match hash value 355), the data of the document may be provided to the application, at 560. For example, data 316 of document 315 may be provided to APP 164. In one instance, security agent 299 may permit OS 162 to provide data 316 of document 315 to APP 164. In another instance, document security executable instructions 345 may permit OS 162 to provide data 316 of document 315 to APP 164.

Figure 5C:
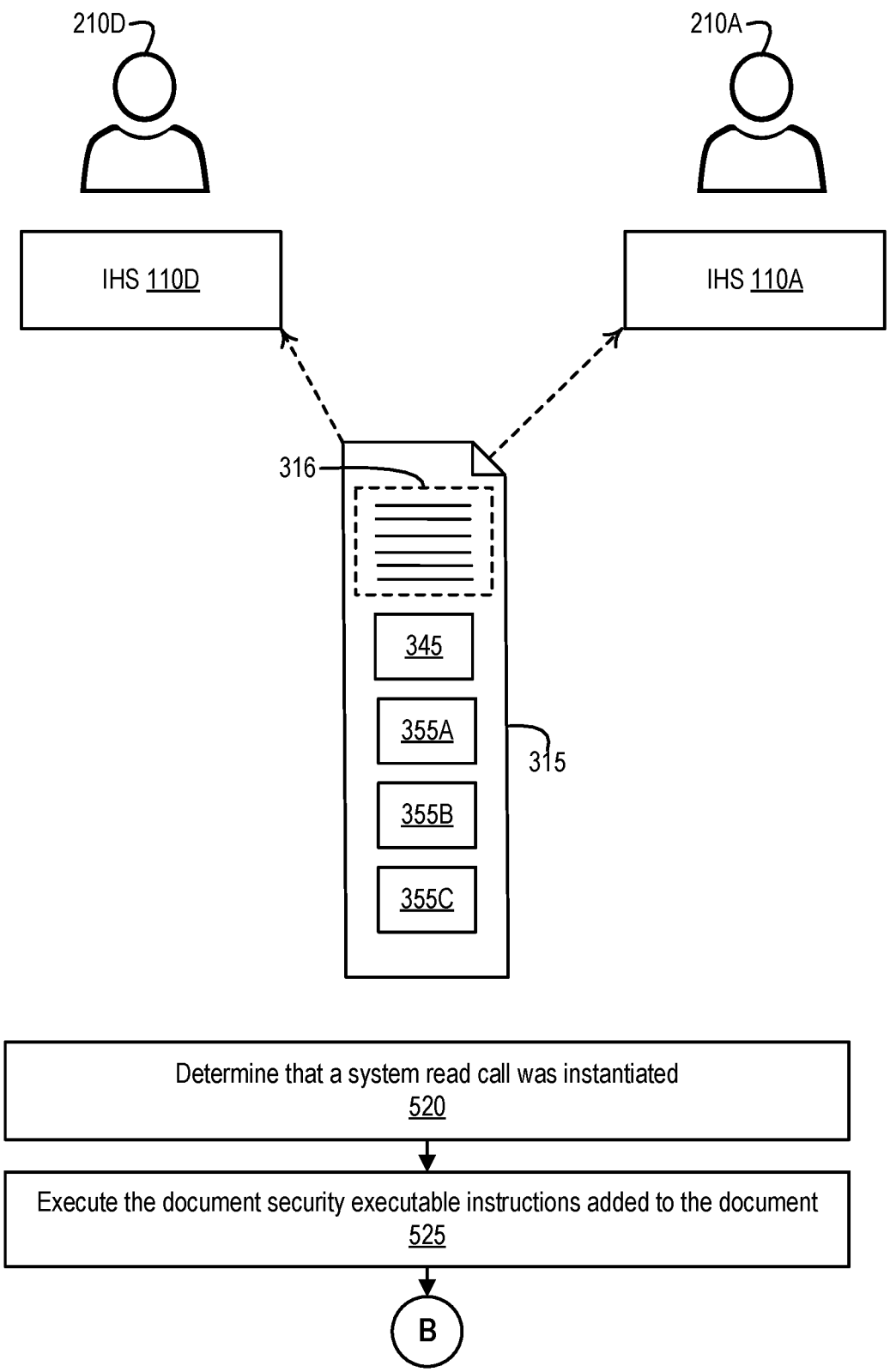
FIGS. 5C and 5D illustrate a second example of a method of utilizing a document with document security instructions, according to one or more embodiments.
Figure 5D:
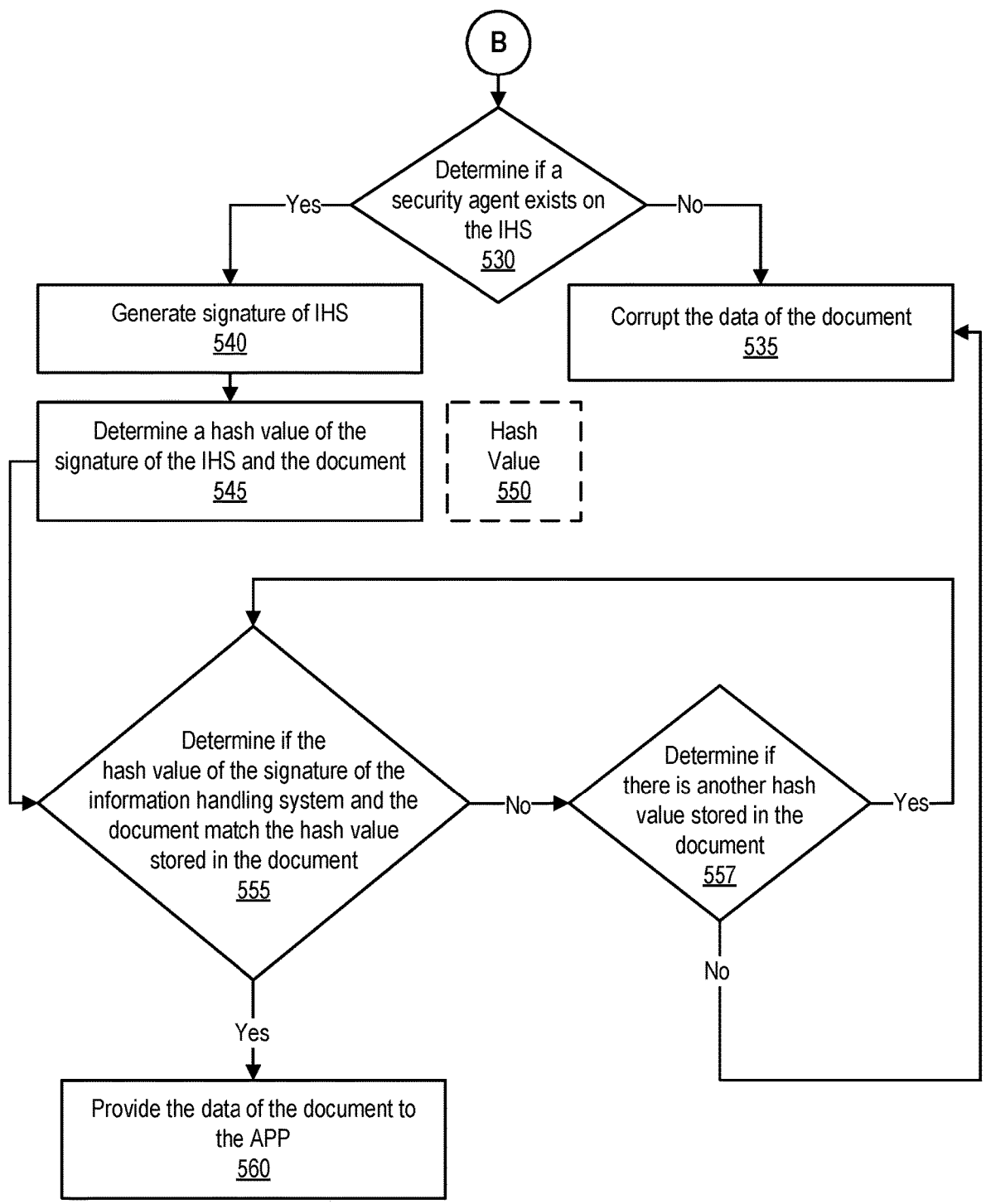

Turning now to FIGS. 5C and 5D, a second example of a method of utilizing a document with document security instructions is illustrated, according to one or more embodiments. As shown, document 315 may include multiple hash values 355A-355C. For example, hash values 355A-355C may be respectively associated with IHSs 110A-110C. Method elements 520-545, 555, and 560 of FIGS. 5C and 5D may be performed as method elements 20-545, 555, and 560 are described with reference to FIGS. 5A and 5B.

In one or more embodiments, method element 555 may be performed for each hash value of multiple hash values of document 315 or until a hash value of the signature of the information handling system and the document match a hash value stored in the document. For example, method element 555 may be performed for each hash value 355 of hash values 355A-355C or until hash value 550 matches one of hash values 355A-355C. If hash value 550 matches a hash value of hash values 355A-355C, the method may proceed to 560. If hash value 550 does not match a hash value of hash values 355A-355C, it may be determined if there is another hash value stored in document 315, at 557. If there is another hash value stored in document 315, the method may proceed to 555. If there is not another hash value stored in document 315, the method may proceed to 535. As an example, if the method illustrated in FIGS. 5C and 5D is performed on an IHS of IHSs 110A-110C, the method may proceed to 560. As another example, if the method illustrated in FIGS. 5C and 5D is performed on IHS 110D, the method may proceed to 535.

Figure 6:
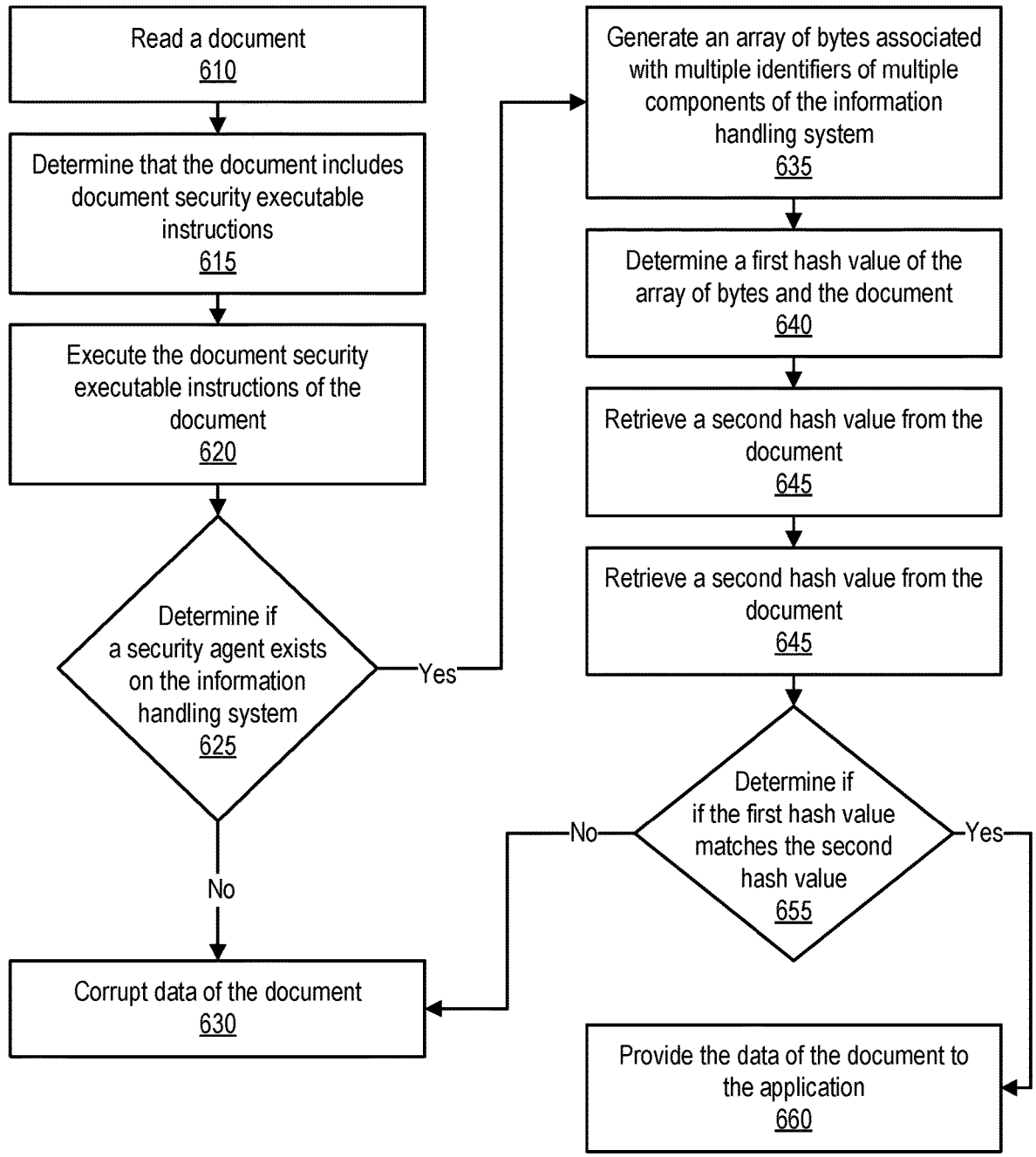
FIG. 6 illustrates another example of a method of utilizing a document with document security instructions is illustrated, according to one or more embodiments.

Turning now to FIG. 6, another example of a method of utilizing a document with document security instructions is illustrated, according to one or more embodiments. At 610, a document may be read. For example, APP 164 may read document 315. At 615, it may be determined that the document includes document security executable instructions. For example, APP 164 may determine that document 315 includes document security executable instructions 345.

At 620, the document security executable instructions of the document may be executed. In one example, APP 164 may execute document security executable instructions 345 of document 315. In another example, processor 120 may execute document security executable instructions 345 of document 315. At 625, it may be determined if a security agent exists on an information handling system. For example, APP 164 may determine if security agent 299 exists on IHS 110.

If the security agent does not exist on the information handling system, data of the document may be corrupted, at 630. For example, if security agent 299 does not exist on IHS 110, APP 164 may corrupt data 316 of document 315. If the security agent does exist on the information handling system, an array of bytes associated with multiple identifiers of multiple components of the information handling system may be generated, at 635. For example, if security agent 299 does exist on IHS 110, security agent 299 may generate an array of bytes associated with multiple identifiers of multiple components of IHS 110. In one or more embodiments, generating the array of bytes associated with the multiple identifiers of the multiple components of the information handling system may include combining the multiple identifiers of the multiple components into the array of bytes.

At 640, a first hash value of the array of bytes and the document may be determined. For example, security agent 299 may determine hash value 550 of the array of bytes and document 315. At 645, a second hash value may be retrieved from the document. For example, security agent 299 may retrieve hash value 355 from document 315.

At 650, it may be determined if the first hash value matches the second hash value. For example, security agent 299 may determine if hash value 550 matches hash value 355. If the first hash value does not match the second hash value, the data of the document may be corrupted, at 655. In one example, security agent 299 may corrupt data 316 of document 315. In another example, document security executable instructions 345 may corrupt data 316 of document 315. For instance, security agent 299 may instruct document security executable instructions 345 to corrupt data 316 of document 315. If the first hash value does match the second hash value, the data of the document may be provided to the application, at 660. For example, security agent 299 may provide data 316 of document 315 to APP 164. For instance, security agent 299 providing data 316 of document 315 to APP 164 may include permitting OS 162 to provide data 316 of document 315 to APP 164.

Figure 7:
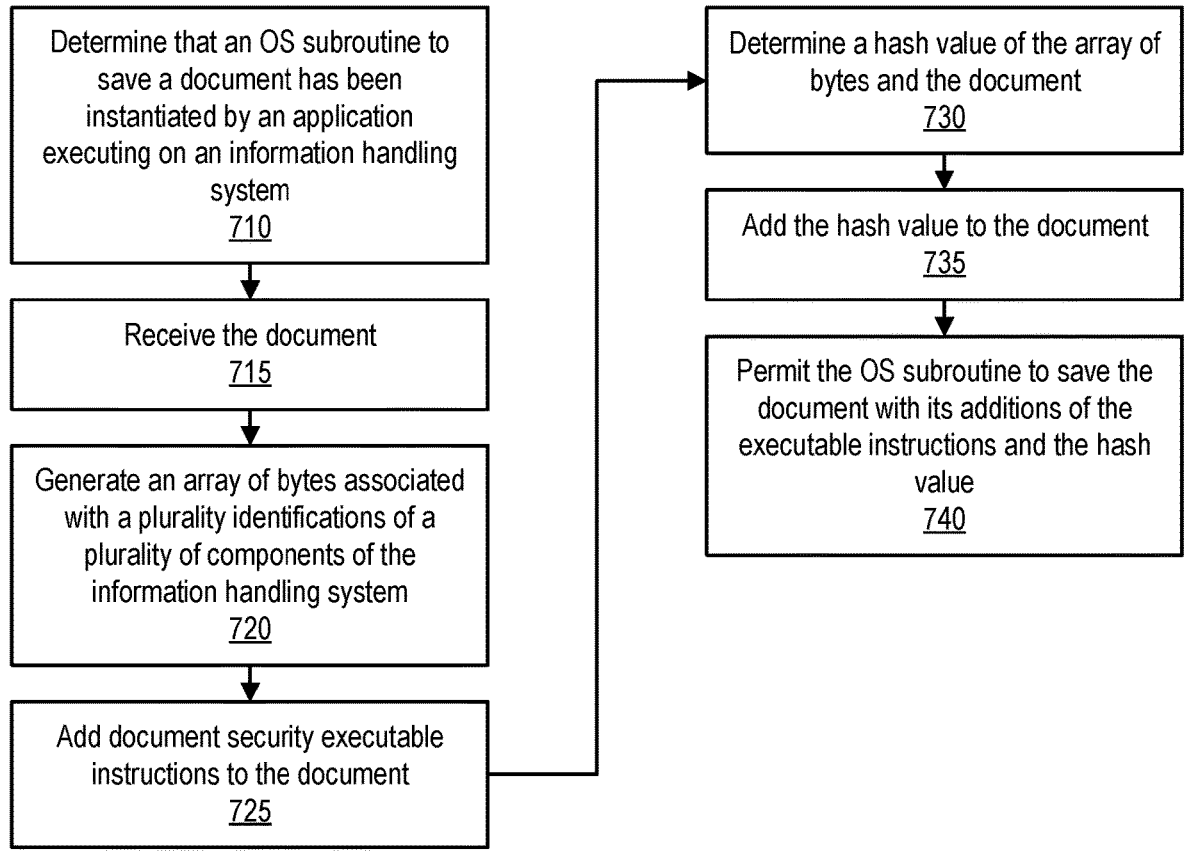
FIG. 7 illustrates another example of a method of saving a document, according to one or more embodiments.

Turning now to FIG. 7, another example of a method of saving a document is illustrated, according to one or more embodiments. At 710, it may be determined that an operating system subroutine to save a document has been instantiated by an application executing on an information handling system. For example, security agent 299 may determine that an operating system subroutine to save document 315 has been instantiated by APP 164 executing on IHS 110. For instance, an operating system subroutine to save a document may include an operating system subroutine to write a document to a memory medium. In one or more embodiments, determining that an operating system subroutine to save a document has been instantiated by an application may include intercepting a call to the operating system subroutine to save the document.

At 715, the document may be received. For example, security agent 299 may receive document 315. In one or more embodiments, receiving the document may be performed in response to determining that operating system subroutine to save the document has been instantiated. At 720, an array of bytes associated with multiple identifications of multiple components of the information handling system may be generated. For example, security agent 299 may generate an array of bytes associated with multiple identifications of multiple components of IHS 110. In one or more embodiments, generating the array of bytes associated with the multiple identifiers of the multiple components of the information handling system may include combining the multiple identifiers of the multiple components into the array of bytes.

At 725, document security executable instructions may be added to the document. For example, security agent 299 may add document security executable instructions 345 to document 315. At 730, a hash value of the array of bytes and the document may be determined. For example, security agent 299 may determine hash value 355 of the array of bytes and document 355.

At 735, the hash value may be added to the document. For example, security agent 299 may add hash value 355 to document 315. At 740, the operating system subroutine may be permitted to save the document with its additions of the document security executable instructions and the hash value. For example, security agent 299 may permit the operating system subroutine to save document 315 with its additions of document security executable instructions 345 and hash value 355.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a processor; and
   a memory medium, coupled to the processor, that stores instructions executable by the processor, which when executed by the processor, cause the information handling system to:
   read a document;
   determine that the document includes document security executable instructions;
   execute the document security executable instructions of the document;
   determine if a security agent exists on the information handling system;
   if the security agent does not exist on the information handling system, corrupt data of the document; and
   if the security agent does exist on the information handling system:
      load a kernel loadable module, which includes the security agent, into an operating system executing on the information handling system;
      generate an array of bytes associated with a plurality of identifiers of a plurality of components of the information handling system;
      determine a first hash value of the array of bytes and the document;
      retrieve a second hash value from the document;
      determine if the first hash value matches the second hash value;
      if the first hash value does not match the second hash value, corrupt the data of the document; and
      if the first hash value does match the second hash value, provide the data of the document to an application.

2. The information handling system of claim 1, wherein, to execute the document security executable instructions of the document, the application causes the processor to execute the document security executable instructions of the document.

3. The information handling system of claim 1, wherein, to execute the document security executable instructions of the document, the application executes the document security executable instructions of the document.

4. The information handling system of claim 1, wherein the plurality of identifiers of the plurality of components of the information handling system include two of more of a processor identifier of the processor, a graphics processing unit (GPU) identifier of a GPU, a display identifier of a display, a volatile memory medium identifier of a volatile memory medium, a first non-volatile memory medium identifier of a first non-volatile memory medium, a second non-volatile memory medium identifier of a second non-volatile memory medium, a network interface identifier of a network interface, an information handling system firmware (IHSFW) identifier of IHSFW, a virtual private network (VPN) identifier of a VPN connection, a keyboard identifier of a keyboard, and a pointing device identifier of a pointing device.

5. The information handling system of claim 1, wherein, to generate the array of bytes, the instructions further cause the information handling system to combine the plurality of identifiers of the plurality of components of the information handling system.

6. The information handling system of claim 1, wherein at least one of the plurality of identifiers includes a network address.

7. A method, comprising:
- reading, by an application executing on an information handling system, a document;
- determining, by the application, that the document includes document security executable instructions;
- executing the document security executable instructions of the document;
- determining if a security agent exists on the information handling system;
- if the security agent does not exist on the information handling system, corrupting data of the document; and
- if the security agent does exist on the information handling system:
  - loading a kernel loadable module, which includes the security agent, into an operating system executing on the information handling system;
  - generating an array of bytes associated with a plurality of identifiers of a plurality of components of the information handling system;
  - determining a first hash value of the array of bytes and the document;
  - retrieving a second hash value from the document;
  - determining if the first hash value matches the second hash value;
  - if the first hash value does not match the second hash value, performing the corrupting the data of the document; and
  - if the first hash value does match the second hash value, providing the data of the document to the application.

8. The method of claim 7, wherein the executing the document security executable instructions of the document includes the application executing the document security executable instructions of the document.

9. The method of claim 7, wherein the executing the executable instructions of the document includes the application instructing a processor of the information handling system to execute the executable instructions of the document.

10. The method of claim 7, wherein the plurality of identifiers of the plurality of components of the information handling system include two of more of a processor identifier of the processor, a graphics processing unit (GPU) identifier of a GPU, a display identifier of a display, a volatile memory medium identifier of a volatile memory medium, a first non-volatile memory medium identifier of a first non-volatile memory medium, a second non-volatile memory medium identifier of a second non-volatile memory medium, a network interface identifier of a network interface, an information handling system firmware (IHSFW) identifier of IHSFW, a virtual private network (VPN) identifier of a VPN connection, a keyboard identifier of a keyboard, and a pointing device identifier of a pointing device.

11. The method of claim 7, wherein the generating the array of bytes includes combining the plurality of identifiers of the plurality of components of the information handling system.

12. The method of claim 7, wherein at least one of the plurality of identifiers includes a network address.

13. A computer-readable non-transitory memory medium that includes instructions that, when executed by a processor of an information handling system, cause the information handling system to:
- read a document;
- determine that the document includes document security executable instructions;
- execute the document security executable instructions of the document;
- determine if a security agent exists on the information handling system;
- if the security agent does not exist on the information handling system, corrupt data of the document; and
- if the security agent does exist on the information handling system:
  - load a kernel loadable module, which includes the security agent, into an operating system executing on the information handling system;
  - generate an array of bytes associated with a plurality of identifiers of a plurality of components of the information handling system;
  - determine a first hash value of the array of bytes and the document;
  - retrieve a second hash value from the document;
  - determine if the first hash value matches the second hash value;
  - if the first hash value does not match the second hash value, corrupt the data of the document; and
  - if the first hash value does match the second hash value, provide the data of the document to the application.

14. The computer-readable non-transitory memory medium of claim 13, wherein, to execute the document security executable instructions of the document, the application causes the processor to execute the document security executable instructions of the document.

15. The computer-readable non-transitory memory medium of claim 13, wherein the plurality of identifiers of the plurality of components of the information handling system include two of more of a processor identifier of the processor, a graphics processing unit (GPU) identifier of a GPU, a display identifier of a display, a volatile memory medium identifier of a volatile memory medium, a first non-volatile memory medium identifier of a first non-volatile memory medium, a second non-volatile memory medium identifier of a second non-volatile memory medium, a network interface identifier of a network interface, an information handling system firmware (IHSFW) identifier of IHSFW, a virtual private network (VPN) identifier of a VPN connection, a keyboard identifier of a keyboard, and a pointing device identifier of a pointing device.

16. The computer-readable non-transitory memory medium of claim 13, wherein, to generate the array of bytes, the instructions further cause the information handling system to combine the plurality of identifiers of the plurality of components of the information handling system.

17. The computer-readable non-transitory memory medium of claim 13, wherein at least one of the plurality of identifiers includes a network address.

* * * * *